United States Patent
Wang

(10) Patent No.: US 10,963,097 B2
(45) Date of Patent: Mar. 30, 2021

(54) METHOD, ELECTRONIC DEVICE, AND APPARATUS FOR TOUCH-REGION CALIBRATION

(71) Applicant: Lenovo (Beijing) Co., Ltd., Beijing (CN)

(72) Inventor: Huan Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 60 days.

(21) Appl. No.: 15/941,406

(22) Filed: Mar. 30, 2018

(65) Prior Publication Data

US 2019/0087053 A1 Mar. 21, 2019

(30) Foreign Application Priority Data

Sep. 18, 2017 (CN) .......................... 201710844478.6

(51) Int. Cl.
  *G06F 3/041* (2006.01)
  *H04N 5/232* (2006.01)
  *G06F 3/042* (2006.01)

(52) U.S. Cl.
  CPC .......... *G06F 3/0418* (2013.01); *G06F 3/0425* (2013.01); *H04N 5/232* (2013.01); *H04N 5/23245* (2013.01)

(58) Field of Classification Search
  CPC combination set(s) only.
  See application file for complete search history.

(56) References Cited

U.S. PATENT DOCUMENTS

| 2007/0097213 A1* | 5/2007 | Ajito ........................ G01J 3/50 348/189 |
| 2007/0182725 A1 | 8/2007 | Pittel |
| 2011/0301885 A1* | 12/2011 | Tam ......................... G01J 1/08 702/57 |
| 2013/0162603 A1* | 6/2013 | Peng ..................... G06F 3/0418 345/178 |
| 2013/0241888 A1 | 9/2013 | Sharma |
| 2014/0236159 A1* | 8/2014 | Haider ............... A61B 17/1626 606/88 |
| 2015/0042789 A1* | 2/2015 | Inwood ............... G01B 11/026 348/135 |

(Continued)

FOREIGN PATENT DOCUMENTS

| CN | 101231565 A | 7/2008 |
| CN | 101581993 A | 11/2009 |

(Continued)

OTHER PUBLICATIONS

CN101751179A Qiansong Shi; Publication Jun. 23, 2010 English Machine translation (Year: 2010).*

*Primary Examiner* — Van N Chow
(74) *Attorney, Agent, or Firm* — Anova Law Group, PLLC

(57) ABSTRACT

The present disclosure provides a method for touch-region calibration. The method includes controlling a switch of a camera assembly in an electronic device to turn off an infrared filtering function of an infrared filter of the camera assembly, according to a calibration instruction; detecting a plurality of calibrated objects using the camera assembly; and determining a range of a touch region on the electronic device according to the plurality of calibrated objects.

17 Claims, 6 Drawing Sheets

(56) References Cited

U.S. PATENT DOCUMENTS

2016/0022374 A1* 1/2016 Haider ................. A61B 17/17
                                                        606/96
2018/0255266 A1* 9/2018 Tamura ............... H04N 5/7416
2019/0087053 A1* 3/2019 Wang .................. H04N 5/232

FOREIGN PATENT DOCUMENTS

CN   101751179 A   6/2010
CN   105377175 A   3/2016

* cited by examiner

METHOD, ELECTRONIC DEVICE, AND APPARATUS FOR TOUCH-REGION CALIBRATION

CROSS-REFERENCES TO RELATED APPLICATIONS

This application claims priority of Chinese Patent Application No. 201710844478.6, filed on Sep. 18, 2017, the entire contents of which are hereby incorporated by reference.

FIELD OF THE DISCLOSURE

The present disclosure generally relates to the field of electronic technology and, more particularly, relates to a method, an electronic device, and an apparatus for touch-region calibration.

BACKGROUND

With the development of intelligence, human-computer interaction technology changes on a day-to-day basis. Using a combination of a sensor and a display region to form a simulated touch-control system provides a new interaction method. The method can directly change a display region that originally does not have any touch-control function to a touch-control screen, through which, interactions with the computer can be achieved.

Before the simulated touch system can be used, however, the touch region needs to be calibrated, which requires human involvement for the calibration process and affects the user experience.

The disclosed method, apparatus, and device for touch-region calibration are directed to solve one or more problems set forth above and other problems in the art.

BRIEF SUMMARY OF THE DISCLOSURE

One aspect of the present disclosure provides a method for touch-region calibration. The method includes controlling a switch of a camera assembly in an electronic device to turn off an infrared filtering function of an infrared filter of the camera assembly, according to a calibration instruction; detecting a plurality of calibrated objects using the camera assembly; and determining a range of a touch region on the electronic device according to the plurality of calibrated objects.

Another aspect of the present disclosure provides an electronic device for touch-region calibration. The electronic device includes a camera assembly, a memory, and a processor. The camera assembly includes an infrared filter and a switch. The switch controls a mode of the infrared filter. The memory stores computer-readable instructions, and the processor is coupled with the camera assembly and the memory. When the computer-readable instructions are executed by the processor, the processor controls the switch to turn off an infrared filtering function of the infrared filter according to a calibration instruction, detects a plurality of calibrated object using the camera assembly, and determines a range of a touch region according to the plurality of calibrated objects.

Another aspect of the present disclosure provides a touch-region calibration apparatus. The touch-region calibration apparatus includes a first controller, a detector, and a determination device. The first controller controls a switch of a camera assembly in an electronic device to turn off an infrared filtering function of an infrared filter, according to a calibration instruction. The detector detects a plurality of calibrated objects through the camera assembly. The determination device determines a range of a touch region on the electronic device according to the plurality of calibrated objects.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1A:
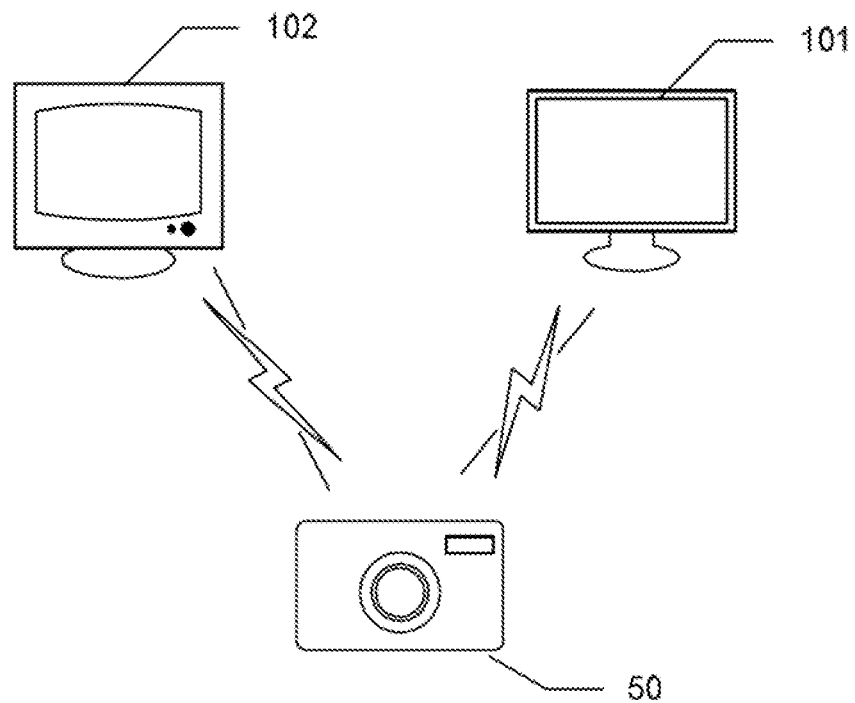
FIG. 1A illustrates a schematic application scenario of a method for touch-region calibration and an electronic device consistent with some embodiments of the present disclosure.

Reference will now be made in detail to various embodiments of the disclosure, which are illustrated in the accompanying drawings. It should be understood that the descriptions in the present disclosure are merely illustrative, and are not intended to limit the scope of the present disclosure. Moreover, in the following illustration, description on the well-known structures and techniques may be skipped to avoid unnecessary confusion on the concepts of the present disclosure.

The terminology used in the present disclosure is merely for describing specific embodiments, and not intended to limit the present disclosure. Unless otherwise specified, the terms "a", "an", "the", etc. used in the present disclosure should also include the meaning of "a plurality of" or "a variety of". Furthermore, the terms "include", "contain", etc. used in the present disclosure indicate the presence of the stated features, steps, operations, and/or components, but do not preclude the presence or addition of one or more other features, steps, operations, or components.

Unless otherwise defined, all terms (including technical and scientific terms) used in the present disclosure should have the meanings as commonly understood by one of ordinary skill in the art. It should be noted that terms used herein should be interpreted as having a meaning that is consistent with the context of the present description and should not be interpreted in an idealized or overly stereotypical manner.

In the case of using expressions such as "at least one of A, B, and C", it should be generally interpreted in light of common understanding of those skilled in the art (for example, "having at least one system of A, B, and C" should include, but is not limited to, systems that have A alone, have B alone, have C alone, have A and B, have A and C, have B and C, and/or have A, B and C). In the case of using expressions such as "at least one of A, B, or C", it should be generally interpreted in light of common understanding of those skilled in the art (for example, "having at least one system of A, B, or C" should include, but is not limited to, systems that have A alone, have B alone, have C alone, have A and B, have A and C, have B and C, and/or have A, B, and C). Those skilled in the art should also understand that any conjunction and/or phrase that is applied to two or more selectable items, no matter it appears in the specification, the claims, or the drawings, should essentially be interpreted as providing the possibility of including one of the items, and/or either or both of the items. For example, the phrase "A or B" should be interpreted as the possibility of including "A" or "B", or "A and B".

The drawings illustrate some block diagrams and/or flowcharts. It should be understood that some blocks or combinations of the blocks of the block diagrams and/or flowcharts may be implemented through computer program instructions. These computer program instructions may be provided to a processor of a general-purpose computer, a special-purpose computer, or other programmable data processing device, such that when the instructions are executed by the processor, devices that can be used to realize the functions/operations of these block diagrams and/or flowcharts may be created.

Therefore, the techniques described in the present disclosure may be implemented in the form of hardware and/or software (including firmware, microcode, etc.). In addition, the techniques described in the present disclosure may take the form of a computer program product that has instructions stored on a computer-readable medium. The computer program product may be used by an instruction execution system or may be used in combination with an instruction execution system. In the context of the present disclosure, a computer-readable medium may be any medium that can contain, store, communicate, propagate, or transport the instructions. For example, the computer-readable medium may include, but are not limited to, electrical, magnetic, optical, electromagnetic, infrared, or semiconductor systems, apparatuses, devices, or propagation media. Specific examples of the computer-readable medium include a magnetic storage device such as a magnetic tape or hard disk drive (HDD), an optical storage device such as a compact-disc read-only memory (CD-ROM), a memory such as a random access memory (RAM) or a flash memory, and/or a wired/wireless communication link.

Figure 1B:
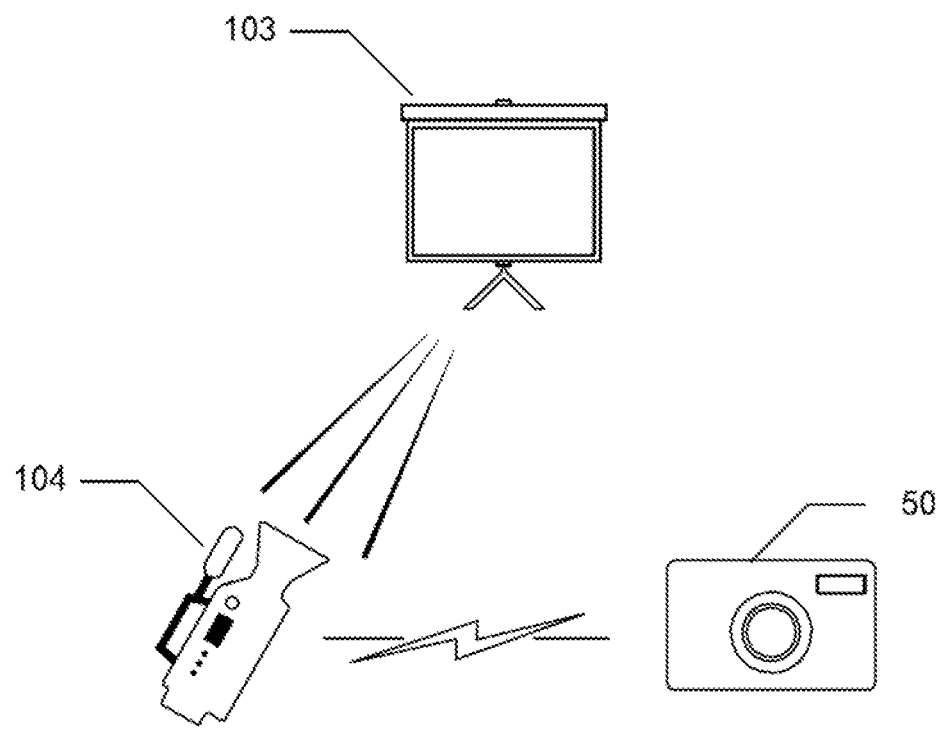
FIG. 1B illustrates another schematic application scenario of a method for touch-region calibration and an electronic device consistent with some embodiments of the present disclosure.

The present disclosure provides a method for touch-region calibration and an electronic device. FIG. 1A and FIG. 1B each illustrates a schematic application scenario of a method for touch-region calibration and an electronic device consistent with some embodiments of the present disclosure.

As shown in FIG. 1A, the application scenario may include a region intended for touching, for example, a computer monitor 101 or a smart television (TV) 102 as shown in the figure. When a user operates on the computer monitor 101 or the smart TV 102, an electronic device 50 may be able to detect the information of the user's operation and send the information to the computer or the smart TV 102 such that the computer monitor 101 or the smart TV 102 may be able to have a touch-control function.

Prior to using the touch-control function, the touch region may need to be calibrated. For example, the electronic device 50 may recognize a specific calibrated object, and through calibrating the position of the calibrated object, the electronic device 50 may thus calibrate the touch region.

The electronic device 50 may include a camera assembly. The camera assembly may include an infrared filter and a switch. The switch may be able to control the mode of the infrared filter. When the infrared filtering function of the infrared filter is turned off, the system (e.g., the electronic device 50) may be in a non-infrared mode. At this time, the range of the touch region may be determined according to the calibration instruction and the calibrated object. When the infrared filter is turned on, the touch-control function may be used normally. In addition, when the electronic device 50 receives an image capturing instruction, the switch of the electronic device 50 may be able to turn off the infrared filtering function of the infrared filter according to the instruction. At this time, the electronic device 50 may have the function of normal cameras, e.g., the electronic device 50 may be able to capture the image displayed on the touch region.

As shown in FIG. 1B, the touch region may be a non-electronic product such as a desk surface or a wall surface. For example, the touch region may be a screen 103 shown in the figure. A projection device 104 may project an image onto the screen 103. When a user operates on the screen 103, the electronic device 50 may be able to detect the information of the user's operation, and send the information of the user's operation to the projection device 104 or to other electronic devices connected to the projection device 104. As such, the screen 103 may have a touch-control function. In some embodiments, the projection device 104 and the electronic device 50 may be a same device. That is, the electronic device 50 may be used to not only project an image onto the screen 103, but also detect the information of the user's operation.

The scenarios shown in FIG. 1A and FIG. 1B are merely illustrative, and those skilled in the art may implement various possible application scenarios according to the actual needs.

In the following, various embodiments will be provided to describe the details of the disclosed method and electronic device.

Figure 2:
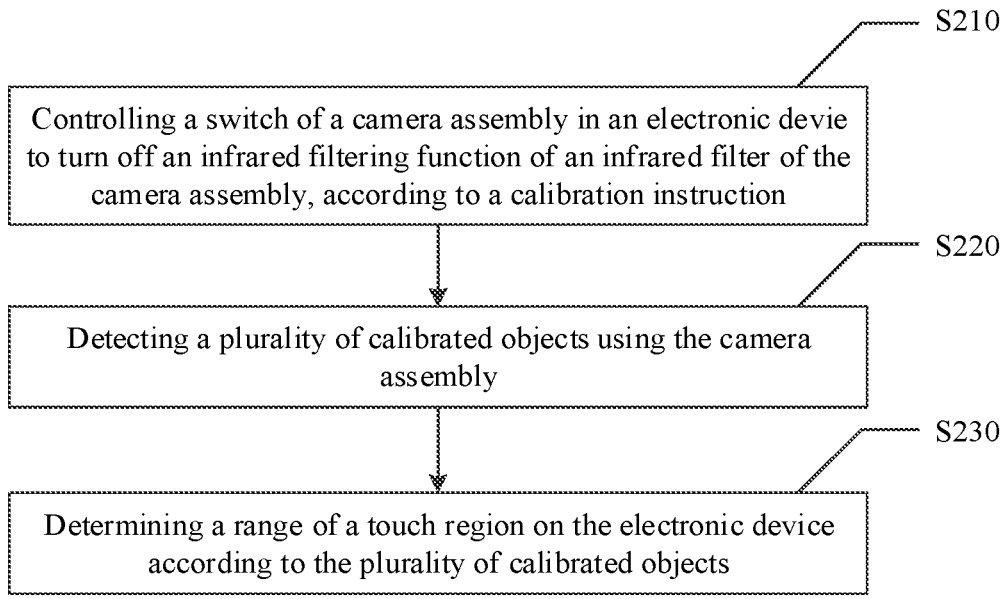
FIG. 2 illustrates a flowchart of a method for touch-region calibration consistent with some embodiments of the present disclosure.

The present disclosure provides a method for touch-region calibration. FIG. 2 illustrates a flowchart of a method for touch-region calibration consistent with some embodiments of the present disclosure. Referring to FIG. 2, the method for calibrating a touch region of an electronic device may include the following operations.

In operation S210, a switch of a camera assembly of the electronic device may be controlled to turn off the infrared filtering function of an infrared filter of the camera assembly according to a calibration instruction.

In operation S220, a plurality of calibrated objects may be detected using the camera assembly.

In operation S230, a range of a touch region on the electronic device may be determined according to the calibrated object.

The disclosed method for touch-region calibration may be able to automatically turn off the infrared mode of an infrared camera such that the infrared camera may be converted from an infrared camera to a normal camera to detect a common calibrated object. Therefore, according to the disclosed method, manually setting infrared calibration points on the touch region may not be required. As such, user's operation may be simplified, and the user experience may be improved.

According to the embodiments of the present disclosure, the calibration instruction may be automatically generated by the electronic device. For example, when the electronic device starts for the first time (e.g., initially starts), or the electronic device initiates the touch-control function, the calibration instruction may be automatically generated. Alternatively, the calibration instruction may be triggered when the user finds that the accuracy of the touch operation is degraded. In other embodiments, the calibration instruction may be a calibration instruction triggered when the electronic device receives a specific operation instruction or receives a calibration instruction from another device. For example, when a button for turning off the infrared filtering function of an infrared filter is pressed, or a calibration instruction issued through remote control, a calibration instruction triggered. Therefore, before a switch of the camera assembly turns off the infrared filtering function of the infrared filter according to the calibration instruction, the calibration instruction may be acquired. The calibration instruction may be acquired through a variety of methods, which are not limited to the embodiments of the present disclosure. In practical applications, those skilled in the art may determine the method for acquiring the calibration instruction based on the actual needs.

According to the disclosed embodiments, when the touch region needs to be calibrated, a calibration instruction may control the mode of the switch of the camera assembly to turn off the infrared filtering function of the infrared filter. The switch may be any device having at least two states. For example, the switch may be a push-button switch, or a toggle switch.

In operation S220, a plurality of calibrated objects are detected by a camera assembly in the electronic device. The camera assembly may be any device capable of capturing images. For example, the camera assembly may be a normal camera or a specifically-assembled camera.

In operation S230, the range of the touch region may be determined according to the calibrated objects. The touch region may refer to a region where the user's touch operation can be identified, that is, to achieve a certain purpose, the user's movement in this region can be identified by the camera assembly working in the infrared mode. The range of the touch region may be preset by a user, or may be a range of a displayable region that is identified by the electronic device.

According to the embodiments of the present disclosure, various modes may be set as required to perform the calibration using the positions of the calibrated objects. For example, when the touch region is a rectangular region, the calibrated objects may be arranged at the four vertices of the rectangular region. Further, when the electronic device identifies the calibrated objects, the touch region may be determined such that the calibration may be completed. In some other embodiments, when the touch region is a rectangular region, the calibrated objects may be arranged at three of the vertices or may be arranged only at two diagonal vertices.

According to the embodiments of the present disclosure, calibrating the calibrated objects may be performed in a certain order. For example, when the touch region is set as a circular region, the position of the center of the circular touch region may be determined according to the calibrated object captured in a first time, and then the radius of the circular touch region may be determined according to the calibrated object captured in a second time. As such, the touch region may be determined, and the calibration may be completed.

According to the embodiments of the present disclosure, the calibrated objects may also carry the information of the calibration region. For example, the positions of the calibrated objects with certain characteristics may represent the characteristic positions of the corresponding specific touch region (which may include the shape and the size, or may only include one of the two). In one embodiment, two calibrated objects with each having a characteristic shape of "□" may be used to represent two diagonal vertices of a rectangular touch region.

According to the embodiments of the present disclosure, the touch region may be capable of displaying a content, and a plurality of specific display objects used for calibration may be displayed in the touch region. For example, the center of the touch region may display a red flag identifier, and the electronic device may complete the calibration by identifying the red flag identifier. The method may be able to use the existing display function, and detect a plurality of specific display objects for calibration in the display region in the non-infrared mode to realize automatic calibration.

According to the embodiments of the present disclosure, as long as the plurality of calibrated objects and the touch region can be identified by the camera assembly, the scope of the calibrated objects and the touch region may not be limited to the embodiments described above.

Figure 3:
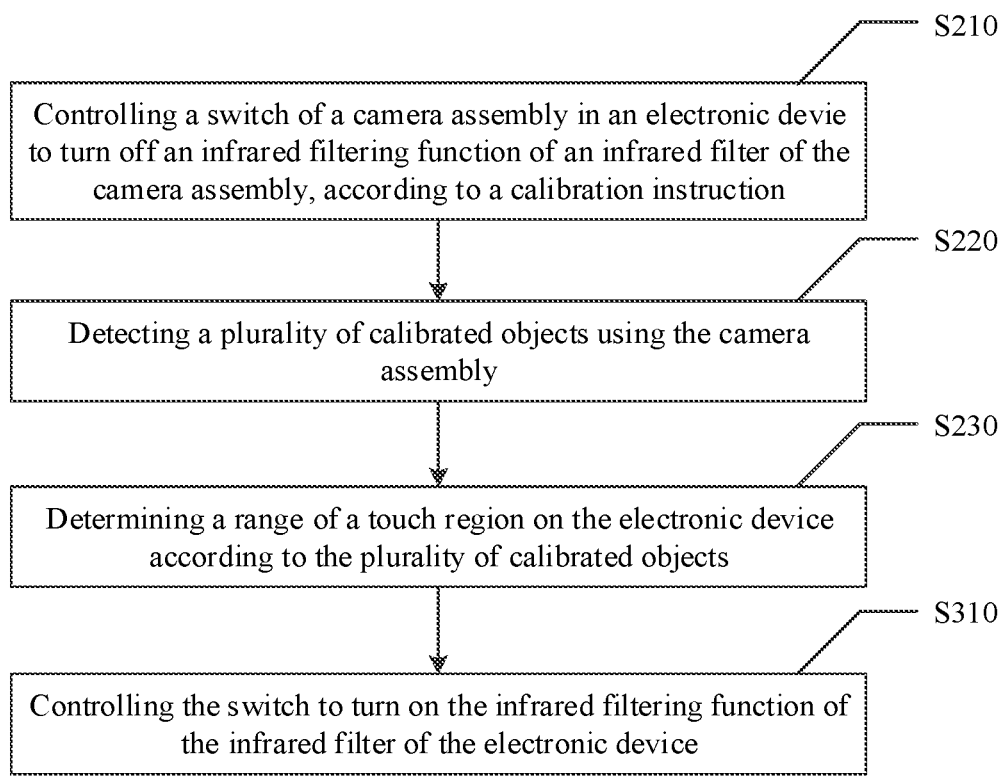
FIG. 3 illustrates a flowchart of another method for touch-region calibration consistent with some embodiments of the present disclosure.

FIG. 3 illustrates a flowchart of another method for touch-region calibration consistent with some embodiments of the present disclosure.

Referring to FIG. 3, on the basis of the embodiment illustrated in FIG. 2, the method may also include operation S310.

In operation S310, after determining the range of the touch region according to the plurality of calibrated objects, the switch may be controlled to turn on the infrared filtering function of the infrared filter.

According to the embodiments of the present disclosure, after the electronic device completes the calibration, the electronic device may automatically turn on the infrared filtering function of the infrared filter, and restore the touch-control function of the electronic device in the touch region.

The method may restore the infrared touch-control function after the calibration, and the whole process may be automatically performed without human intervention.

According to the embodiments of the present disclosure, the electronic device may also be able to turn on the infrared filtering function of the infrared filter according to a user's instruction. When the user needs to wait for the electronic device to perform automatic calibration, and does not care whether the touch-control function is accurate, the user's instruction may still be identified even the touch-control function is not accurate enough. For example, the entire display device may only display one touch-control button, and in this situation, although the touch-control function may not be accurate enough, the user's instruction may still be identified. At this moment, the user can turn off the automatic calibration function of the electronic device to save the waiting time of the user.

Figure 4:
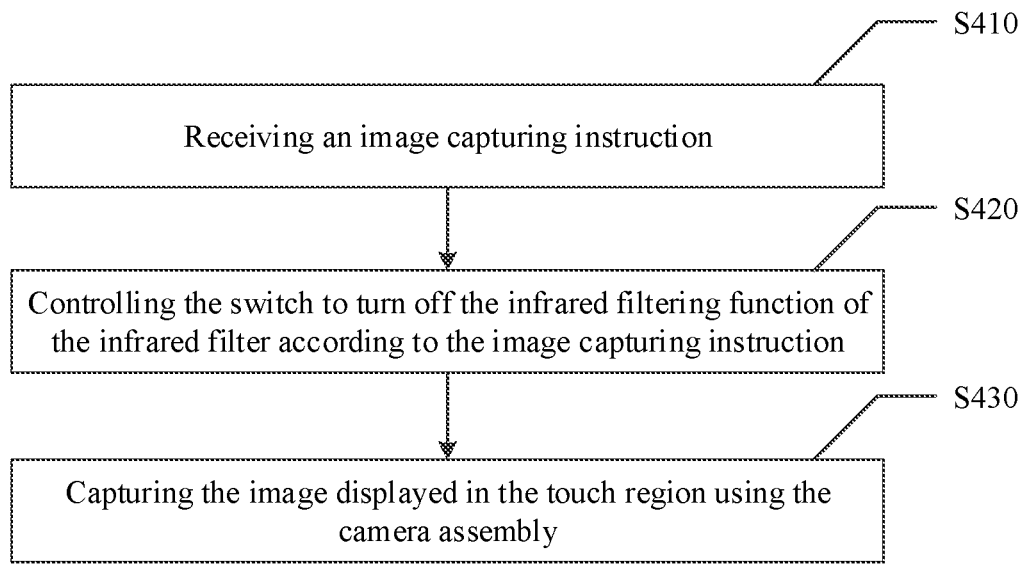
FIG. 4 illustrates a flowchart of another method for touch-region calibration consistent with some embodiments of the present disclosure.

FIG. 4 illustrates a flowchart of another method for touch-region calibration consistent with some embodiments of the present disclosure.

Referring to FIG. 4, on the basis of the embodiment illustrated in FIG. 2, the method may also include operations S410-S430.

In operation S410, an image capturing instruction may be received.

In operation S420, the switch may be controlled to turn off the infrared filtering function of the infrared filter according to the image capturing instruction.

In operation S430, the image displayed in the touch region may be captured through the camera assembly.

For example, when browsing a webpage or watching a video, a user may need to take a screen shot of the content currently displayed. An image capturing instruction may be entered. The processor may receive the image capturing instruction, and control the switch to turn off the infrared filtering function of the infrared filter. A complete screen shot of the image displayed in the touch region may be captured using the camera assembly of the electronic device.

According to the embodiments of the present disclosure, the image capturing process may last for a period of time. For example, using this method, the user may record a presentation video through the gestures and the contents displayed in the display region.

When the camera assembly is in the non-infrared mode, the method can realize a general image capturing function, and improve the using efficiency of the existing hardware.

In another embodiment, a self-calibration event may be triggered prior to calibrating a touch-control system. The self-calibration event may be triggered by an initial installation and starting-up of the touch-control system, the starting-up of the touch-control function, or a calibration instruction sent from a user. The trigger condition for the self-calibration event may be defined according to the design requirements.

After a self-calibration event is triggered, the touch-control system may send an instruction to a switch such that the touch-control system may be switched to a non-infrared mode. For example, the touch-control system may include an infrared filter, and the infrared filtering function may be turned on or turned off by the switch. The switch may be a device having at least two states, e.g., a push-button switch, or a toggle switch. Moreover, one of the at least two states of the switch may correspond to the non-infrared mode in which the infrared function of the infrared filter may be turned off, and another state of the switch may correspond to an infrared mode in which the infrared filtering function of the infrared filter may be turned on.

Further, a specific video pattern may be sent out and displayed on the touch screen of the touch-control system. That is, the touch-control system may display a specific video pattern on the touch screen that needs to be calibrated. For example, the specific video pattern may contain a plurality of calibrated objects.

A camera or a camera assembly of the touch-control system may identify the information of the specific video pattern on the touch screen, and then send the acquired information of the specific video pattern to the touch-control system. For example, the specific video pattern may contain a plurality of calibrated objects, and accordingly, the camera or the camera assembly may identify the calibrated objects and further acquire the positions of the calibrated objects. The acquired positions of the calibrated objects may then be sent to the touch-control system.

Further, the touch-control system may analyze the acquired information of the specific video pattern, and the touch screen of the touch-control system may then be calibrated based on the analysis results. For example, the acquired positions of the calibrated objects may be analyzed by a processor of the touch-control system, and the region of the touch screen be thus be correlated with the positions of the calibrated objects. As such the self-calibration of the touch-control system may be achieved. After the self-calibration process is completed, the touch-control system may send an instruction to the switch such that the touch-control system may be switched to the infrared mode.

In the infrared mode, the touch-control function of the touch-control system may be used normally. That is, a user's operation on the touch screen of the touch-control system may be detected by the camera or the camera assembly and may thus be converted to a corresponding instruction to achieve the touch-control function.

The present disclosure also provides a touch-region calibration apparatus. The touch-region calibration apparatus may be configured in an electronic device and/or may be operated with an electronic device. The electronic device may at least include a hardware processor.

Figure 5:
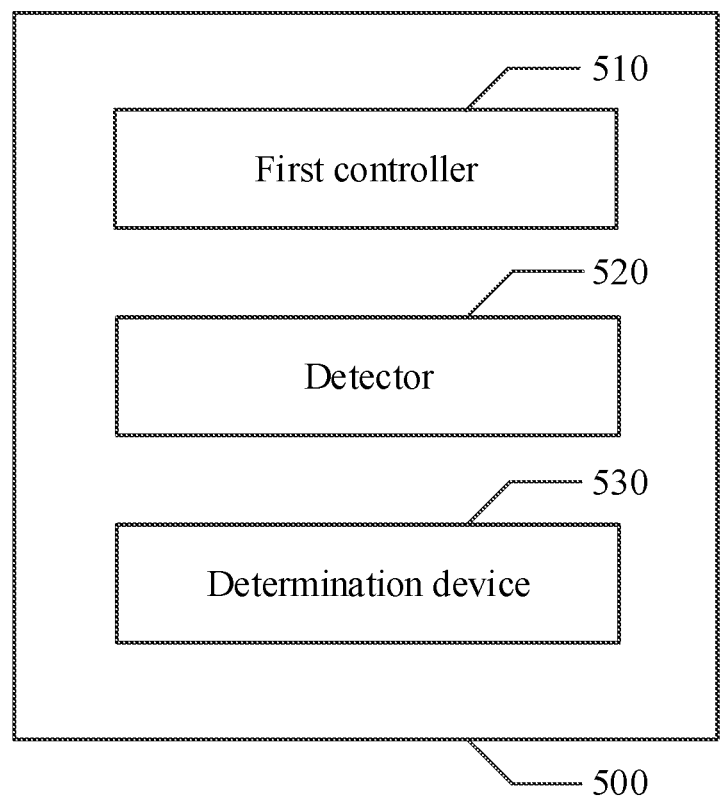
FIG. 5 illustrates a block diagram of a touch-region calibration apparatus consistent with some embodiments of the present disclosure.

FIG. 5 illustrates a block diagram of a touch-region calibration apparatus consistent with some embodiments of the present disclosure.

Referring to FIG. 5, a touch-region calibration apparatus 500 is provided. The touch-region calibration apparatus 500 may include a first controller 510, a detector 520, and a determination device 530.

The first controller 510 may perform, for example, operation S210 described above with reference to FIG. 2, to control the switch to turn off the infrared filtering function of the infrared filter.

The detector 520 may perform, for example, operation S220 described above with reference to FIG. 2, to detect the calibrated objects through the camera assembly.

The determination device 530 may perform, for example, operation S230 described above with reference to FIG. 2, to determine the range of the touch region according to the calibrated objects.

Figure 6:
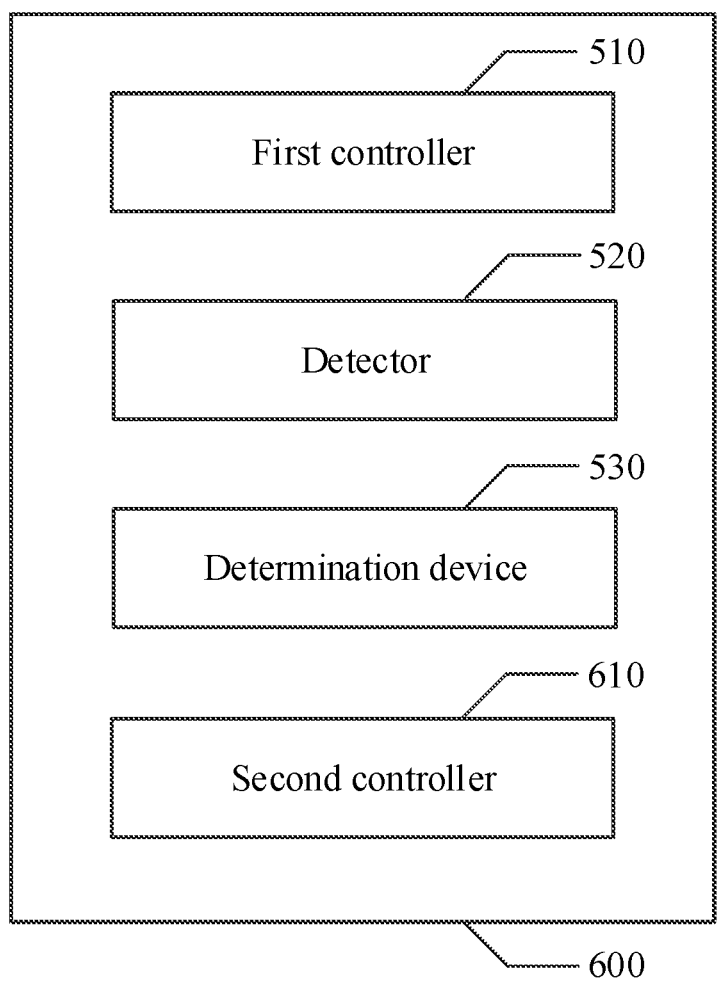
FIG. 6 illustrates a block diagram of another touch-region calibration apparatus consistent with some embodiments of the present disclosure.

FIG. 6 illustrates a block diagram of another touch-region calibration apparatus consistent with some embodiments of the present disclosure.

Referring to FIG. 6, a touch-region calibration apparatus 600 is provided. Based on the system in FIG. 5, the touch-region calibration apparatus 600 in FIG. 6 may also include a second controller 610.

The second controller 610 may perform, for example, operation S310 described above with reference to FIG. 3, to control the switch to turn on the infrared filtering function of the infrared filter after the range of the touch region is determined according to the calibrated objects.

Figure 7:
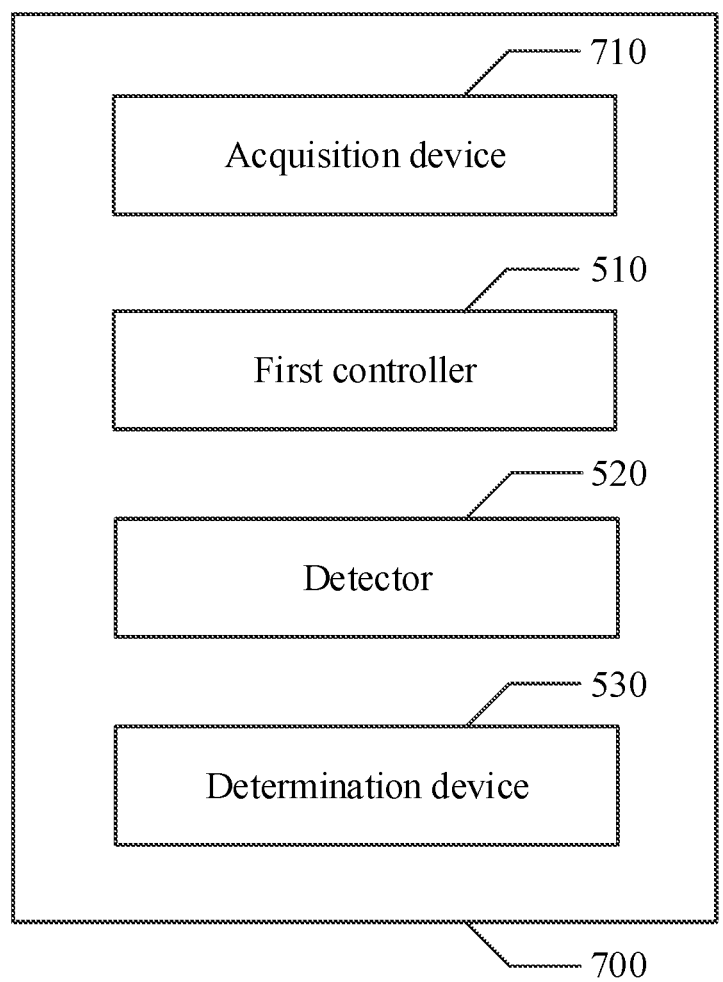
FIG. 7 illustrates a block diagram of another touch-region calibration apparatus consistent with some embodiments of the present disclosure.

FIG. 7 illustrates a block diagram of another touch-region calibration apparatus consistent with some embodiments of the present disclosure.

Referring to FIG. 7, a touch-region calibration apparatus 700 is provided. On the basis of the embodiment shown in FIG. 5, the touch-region calibration apparatus 700 may also include an acquisition device 710.

The acquisition device 710 may perform one or more of the following operations: generating a calibration instruction when the electronic device is initially activated, generating a calibration instruction when the electronic device turns on the touch-control function, triggering a calibration instruction when the accuracy of the touch operation of the user is degraded, receiving a specific operation for generating a calibration instruction, and receiving a calibration instruction.

Figure 8:
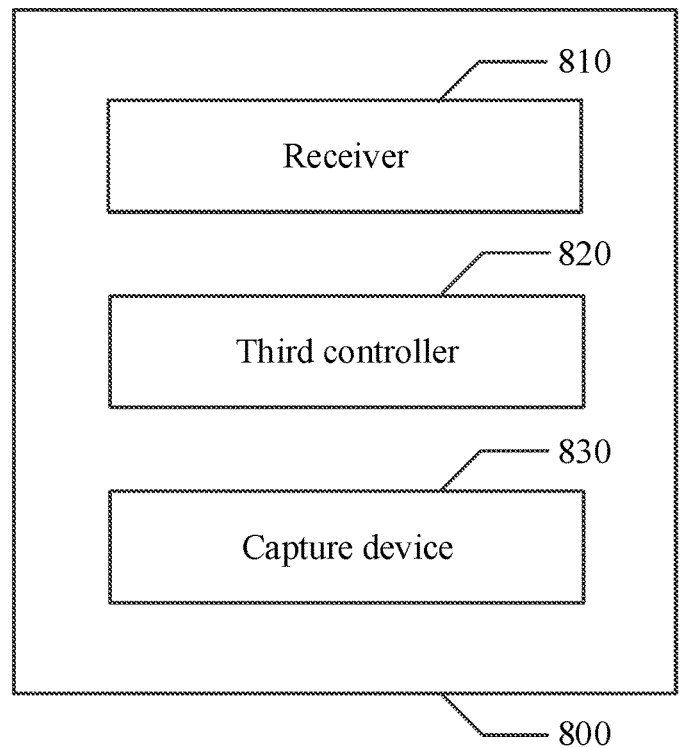
FIG. 8 illustrates a block diagram of another touch-region calibration apparatus consistent with some embodiments of the present disclosure.

FIG. 8 illustrates a block diagram of another touch-region calibration apparatus consistent with some embodiments of the present disclosure.

Referring to FIG. 8, a touch-region calibration apparatus 800 is provided. On the basis of the embodiment shown in FIG. 5, the touch-region calibration apparatus 800 may also include a receiver 810, a third controller 820, and a capture device 830.

The receiver 810 may perform, for example, operation S410 described above with reference to FIG. 4, to receive an image capturing instruction.

The third controller 820 may perform, for example, operation S420 described above with reference to FIG. 4, to control the switch to turn off the infrared filtering function of the infrared filter according to the image capturing instruction.

The capture device 830 may perform, for example, operation S430 described above with reference to FIG. 4, to capture the image displayed in the touch region by using the camera assembly.

Figure 9:
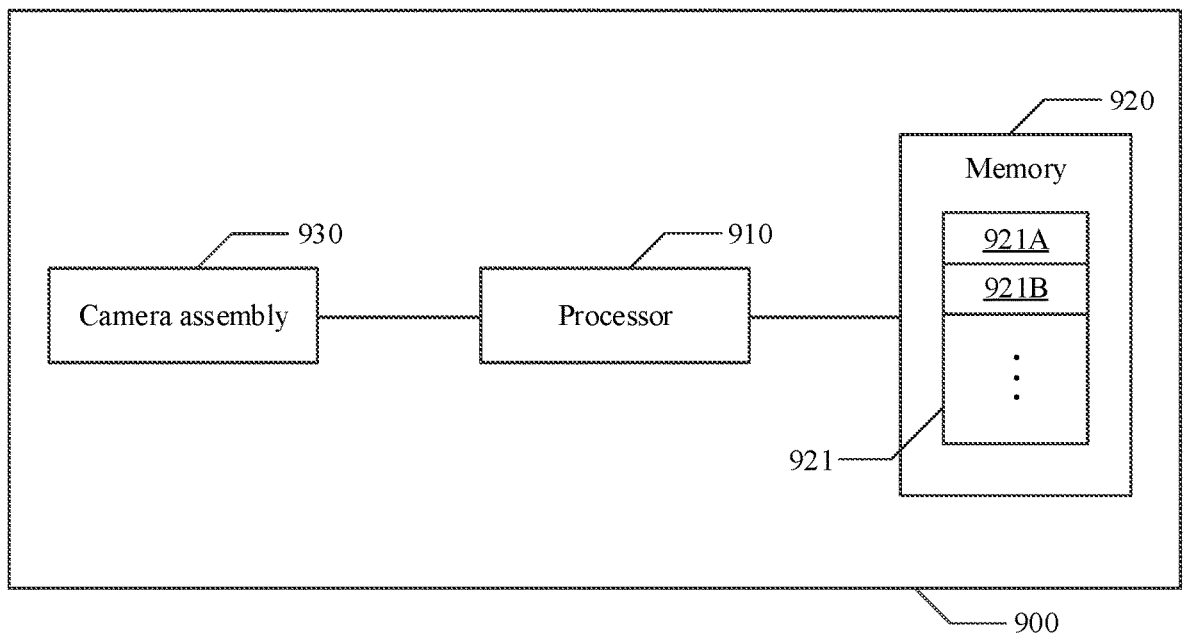
FIG. 9 illustrates a block diagram of an electronic device consistent with some embodiments of the present disclosure.

FIG. 9 illustrates a block diagram of an electronic device consistent with some embodiments of the present disclosure.

Referring to FIG. 9, an electronic device 900 is provided. The electronic device 900 may include a processor 910, a memory 920, and a camera assembly 930. The electronic device 900 may perform the method described above with reference to FIGS. 2-4 to enable automatic calibration of the electronic device.

In one embodiment, the processor 910 may include, for example, a general purpose microprocessor, an instruction set processor, and/or an associated chipset and/or special purpose microprocessor (e.g., application specific integrated circuit, ASIC), and any other appropriate hardware for data processing. The processor 910 may also include an on-board memory for caching. The processor 910 may be a single processing unit or multiple processing units for performing different operations of the method flow according to the embodiments of the present disclosure described with reference to FIGS. 2-4.

The memory 920 may be, for example, any readable medium that can contain, store, communicate, propagate, or transport the instructions. Specifically, the readable medium may include, but is not limited to, electrical, magnetic, optical, electromagnetic, infrared, or semiconductor systems, devices, or propagation media. Some examples of the readable medium include magnetic storage devices such as magnetic tapes or hard drive disks (HDDs), optical storage devices such as compact-disc read-only-memories (CD-ROMs), semiconductor memories such as random access memories (RAMs) and flash memories, and/or wired/wireless communication links.

The memory 920 may store a computer program 921. The computer program 921 may include code/computer-executable instructions. When the computer program 921 is executed by the processor 910, the processor 910 may be able to perform, for example, the method flow described above with reference to FIGS. 2-4 or any modification thereof.

The computer program 921 may be configured with computer program code including, for example, computer program blocks. In one embodiment, the code of the computer program 921 may include one or more program blocks, e.g., a block 921A, a block 921B, etc. The method for defining the program blocks and the number of the program blocks may not be fixed, and those skilled in the art may use or define appropriate program blocks or combinations of program blocks according to actual conditions. When these program blocks or their combinations are executed by the processor 910, the processor 910 may be able to perform, for example, the method flow described above with reference to FIGS. 2-4 or any modification thereof.

According to embodiments of the present disclosure, the processor 910 may interact with the camera assembly 930 to execute the method flow described above with reference to FIGS. 2-4 or any modification thereof.

At least one of the first controller 510, the detector 520, the determination device 530, the second controller 610, the acquisition device 710, the receiver 810, the third controller 820, and the capture device 830 may be implemented as one or more computer program blocks described above with reference to FIG. 9. When these computer program blocks are executed by the processor 910, the corresponding operations described above may be implemented.

Those skilled in the art should understand that, the features described in various embodiments and/or claims of the present disclosure may be combined and/or integrated in various ways, even though such combinations and integration are not explicitly described in the present disclosure. In particular, the features described in the various embodiments and/or claims of the present disclosure may be combined and/or integrated in various ways without departing from the spirit and teachings of the disclosure, and all such combinations and/or integration are within the scope of this disclosure.

Although the present disclosure has been shown and described with reference to certain embodiments thereof, those skilled in the art should understand that various changes in form and/or characteristic may be made without departing from the spirit and scope of the disclosure as defined by the appended claims and their equivalents. Therefore, the scope of the present disclosure should not be limited to the above embodiments, but should be determined not only by the appended claims but also by equivalents of the appended claims.

What is claimed is:

1. A method, comprising:
    performing one or more of following operations:
        generating a calibration instruction, when an electronic device starts for a first time;
        generating the calibration instruction, when the electronic device turns on a touch- control function; and
        receiving a specific operation for generating the calibration instruction;
    detecting a user's touch operation on a touch region that is external to the electronic device:
    triggering the calibration instruction, when an accuracy level of the user's touch operation is reduced;
    controlling, in response to the calibration instruction being triggered, a switch of a camera assembly of the electronic device to turn off an infrared filtering function of an infrared filter of the camera assembly, according to the calibration instruction;
    detecting a plurality of calibrated objects using the camera assembly; and
    determining a range of the touch region according to the plurality of calibrated objects.

2. The method according to claim 1, after determining the range of the touch region according to the plurality of calibrated objects, further including:

controlling the switch to turn on the infrared filtering function of the infrared filter.

3. The method according to claim 1, wherein:
the touch region is a rectangular region; and
the plurality of calibrated objects are set at four vertices of the rectangular region.

4. The method according to claim 1, wherein:
the touch region displays a content; and
the plurality of calibrated objects include a plurality of specific objects displayed in the touch region and used for calibration.

5. The method according to claim 1, further including:
receiving an image capturing instruction;
controlling the switch to turn off the infrared filtering function of the infrared filter according to the image capturing instruction; and
capturing an image displayed in the touch region using the camera assembly.

6. The method according to claim 5, wherein:
the image displayed in the touch region is captured for a period of time using the camera assembly.

7. The method according to claim 1, wherein locations the plurality of calibrated objects are related to a shape of the touch region.

8. The method according to claim 1, further comprising:
receiving an image capturing instruction;
controlling the switch to turn off the infrared filtering function of the infrared filter according to the image capturing instruction; and
capturing, by the electronic device, a video that records a user's gesture and a content displayed in the touch region.

9. An electronic device, comprising:
a camera assembly, including an infrared filter and a switch, wherein the switch controls a mode of the infrared filter;
a memory, storing computer-readable instructions; and
a processor, coupled with the camera assembly and the memory, wherein the computer-readable instructions are executed by the processor, and the processor:
performs one of following operations:
generating a calibration instruction, when the electronic device starts for a first time,
generating the calibration instruction, when the electronic device turns on a touch-control function,
triggering the calibration instruction, when an accuracy level of a user's touch operation is reduced,
receiving a specific operation for generating the calibration instruction,
detects a user's touch operation on a touch region that is external to the electronic device;
triggers the calibration instruction, when an accuracy level of the user's touch operation is reduced;
controls, in response to the calibration instruction being triggered, the switch to turn off an infrared filtering function of the infrared filter according to the calibration instruction,
detects a plurality of calibrated object using the camera assembly, and
determines a range of the touch region according to the plurality of calibrated objects.

10. The device according to claim 9, wherein:
the processor further controls the switch to turn on the infrared filtering function of the infrared filter after the processor determines the range of the touch region according to the plurality of calibrated objects.

11. The device according to claim 9, wherein:
the touch region displays a content, and
the plurality of calibrated objects include a plurality of specific objects that are displayed in the touch region and used for calibration.

12. The device according to claim 9, wherein the processor further:
receives an image capturing instruction;
controls the switch to turn off the infrared filtering function of the infrared filter according to the image capturing instruction; and
captures an image displayed in the touch region using the camera assembly.

13. An apparatus, comprising:
an acquisition device, wherein the acquisition device:
performs one or more of following operations:
generating a calibration instruction, when an electronic device starts for a first time;
generating the calibration instruction, when the electronic device turns on a touch-control function; and
receiving a specific operation for generating the calibration instruction;
detects a user's touch operation on a touch region that is external to the electronic device; and
triggers the calibration instruction, when an accuracy level of the user's touch operation is reduced;
a first controller; wherein the first controller controls, in response to the calibration instruction being triggered, a switch of a camera assembly of the electronic device to turn off an infrared filtering function of an infrared filter, according to the calibration instruction;
a detector, wherein the detector detects a plurality of calibrated objects through the camera assembly; and
a determination device; wherein the determination device determines a range the touch region according to the plurality of calibrated objects.

14. The apparatus according to claim 13, further including:
a second controller, wherein the second controller controls the switch to turn on the infrared filtering function of the infrared filter.

15. The apparatus according to claim 13, wherein:
the touch region is a rectangular region, and
the plurality of calibrated objects are set at four vertices of the rectangular region.

16. The apparatus according to claim 13, wherein:
the touch region displays a content, and
the plurality of calibrated objects include a plurality of specific objects that are displayed in the touch region and used for calibration.

17. The apparatus according to claim 13, further including:
a receiver, wherein the receiver receives an image capturing instruction;
a third controller, wherein the third controller controls the switch to turn off the infrared filtering function of the infrared filter according to the image capturing instruction; and
a capture device, wherein the capture device captures an image displayed in the touch region through the camera assembly.

* * * * *